US008233055B2

(12) United States Patent
Matsunaga et al.

(10) Patent No.: US 8,233,055 B2
(45) Date of Patent: Jul. 31, 2012

(54) IMAGE PROCESSING DEVICE AND PROGRAM

(75) Inventors: Kazuhisa Matsunaga, Tokyo (JP); Shinichi Matsui, Tokyo (JP)

(73) Assignee: Casio Computer Co., Ltd., Tokyo (JP)

(*) Notice: Subject to any disclaimer, the term of this patent is extended or adjusted under 35 U.S.C. 154(b) by 277 days.

(21) Appl. No.: 12/497,837

(22) Filed: Jul. 6, 2009

(65) Prior Publication Data
US 2010/0007761 A1     Jan. 14, 2010

(30) Foreign Application Priority Data
Jul. 9, 2008   (JP) .................... 2008-178971

(51) Int. Cl.
*H04N 5/228*   (2006.01)
*H04N 5/235*   (2006.01)
*H04N 5/262*   (2006.01)
*G06K 9/00*    (2006.01)

(52) U.S. Cl. ............... 348/222.1; 348/239; 382/107
(58) Field of Classification Search .......... 348/222.1, 348/239; 382/107
See application file for complete search history.

(56) References Cited

U.S. PATENT DOCUMENTS
2006/0062433 A1* 3/2006 Ikeda .................. 382/107
2007/0153111 A1  7/2007 Kato
2008/0094498 A1* 4/2008 Mori .................. 348/352
2009/0252377 A1* 10/2009 Akita et al. ............ 382/106

FOREIGN PATENT DOCUMENTS
| JP | 2006-339903 A | 12/2006 |
|---|---|---|
| JP | 2007-049545 A | 2/2007 |
| JP | 2007-074031 A | 3/2007 |
| JP | 2007-184733 A | 7/2007 |
| JP | 2008-065530 A | 3/2008 |

OTHER PUBLICATIONS

Japanese Office Action dated Oct. 5, 2010 (and English translation thereof) in counterpart Japanese Application No. 2008-178971.
Japanese Office Action dated May 11, 2010 and English translation thereof in counterpart Japanese Application No. 2008-178971.

* cited by examiner

*Primary Examiner* — Tuan Ho
*Assistant Examiner* — Shahbaz Nazrul
(74) *Attorney, Agent, or Firm* — Holtz, Holtz, Goodman & Chick, PC

(57) ABSTRACT

A chronological sequence of a plurality of images is obtained, and one of the plurality of images obtained is set as a reference image while remainders thereof are set as object images. A plurality of parameters for converting each of main subject portions of respective plurality of object images to be aligned so as to be superimposed on a main subject portion of the reference image are calculated. Images are combined such that the main subject portions are superimposed with alignment degrees of the parameters degrading as distance from a predetermined location increases.

12 Claims, 6 Drawing Sheets

FINAL COMPOSITE IMAGE 21

FIG. 3
| INDEX k | 0 | 1 | 2 |
|---|---|---|---|
| INTENSITY RATIO $\beta$ | 1 | 3/4 | 1/2 |
FIG. 4A
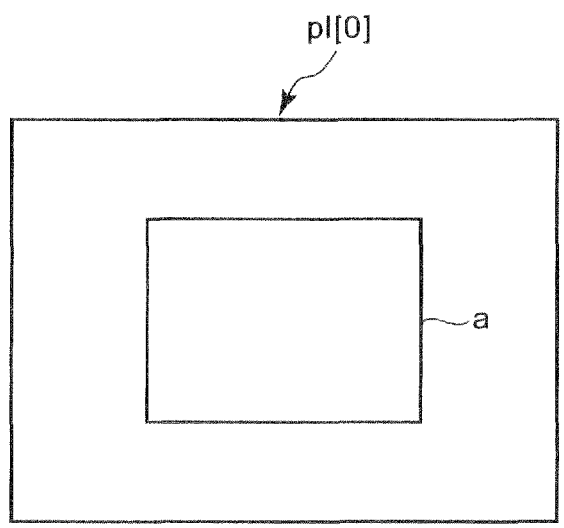
FIG. 4B
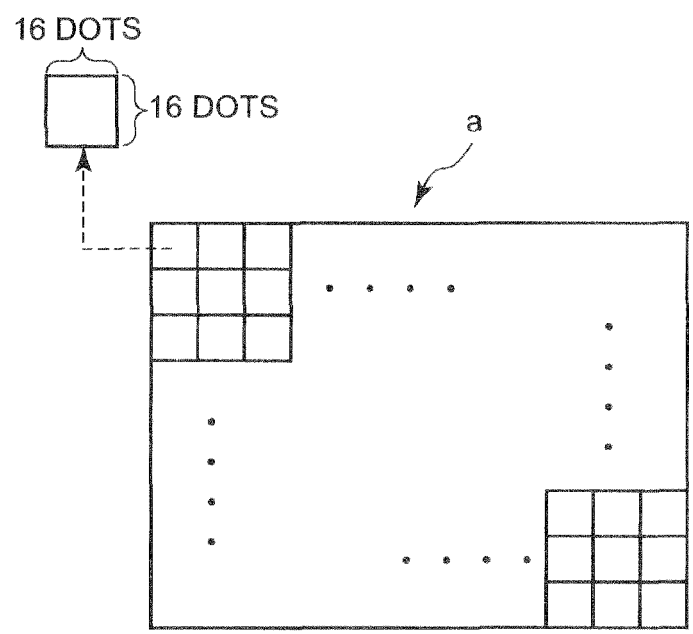

PROJECTIVE TRANSFORMATION MATRIX m[i]
$$\begin{bmatrix} a_i & b_i & s_i \\ c_i & d_i & t_i \\ u_i & v_i & 1_i \end{bmatrix}$$

DAMPING PROJECTIVE TRANSFORMATION MATRIX mβ[i][k]
$$\begin{bmatrix} 1+\beta_k(a_i-1) & \beta_k b_i & \beta_k s_i \\ \beta_k c_i & 1+\beta_k(d_i-1) & \beta_k t_i \\ \beta_k u_i & \beta_k v_i & 1 \end{bmatrix}$$

FINAL COMPOSITE IMAGE 21

CONVENTIONAL COMPOSITE IMAGE 101

IMAGE PROCESSING DEVICE AND PROGRAM

This application is based on and claims the benefit of priority from Japanese Patent Application No. 2008-178971, filed on 9 Jul. 2008, the content of which is incorporated herein by reference.

BACKGROUND OF THE INVENTION

1. Field of the Invention

The present invention relates to an image processing device and program. More specifically, the present invention relates to an image processing device suitable for taking a follow shot of a moving object as a subject, and a program used for the image processing device.

2. Related Art

Conventionally, in order to photograph a moving subject and obtain an image with a sense of speed, a so-called "follow shot," is known. In this follow shot, a shutter speed of a camera is set to be slower than normal, and by a photographer panning the camera in accordance with movement of the subject, an image is obtained in which the subject is still while the background is moving.

That is to say, first, consecutive images along a time-series are obtained, and from these frame images, a subject image that becomes the main is specified. Then, a relative shift amount and shift direction between each frame image of this subject are detected, and based on the detected shift amount and shift direction, each frame image is combined such that the subject images overlap in the same position (see Patent Publication 1).

[Patent Publication 1] Japanese Unexamined Patent Application Publication No 2007-184733

SUMMARY OF THE INVENTION

However, in the method shown in Patent Publication 1, when a plurality of frame images is combined, there are cases in which a striped pattern is generated in the background. A cause of the occurrence of this kind of striped pattern is that movement by a user to cause the camera to follow does not match movement of a moving subject.

That is to say, in a case in which movement to cause a camera to follow is faster than movement of a moving subject, a horizontal dimension of a blur of a background becomes larger in each frame image. When this kind of frame image is combined, part of the blur in each frame image overlaps in the composite image. For example, in a case in which an object of narrow width, such as a pole, is included in a background, a gray image will be generated between portions where a blur of the pole overlaps and does not overlap, and a vertical striped pattern will be generated in the composite image.

On the other hand, in a case in which an action of a camera to follow is slower than an action of a moving subject, a horizontal dimension of a blur of a background will become smaller in each frame image. When this kind of frame image is combined, the blur in each frame image is separated in the composite image. For example, in a case in which an object of narrow width, such as a pole, is included in a background, in a composite image 101 of the prior art, as shown by the dashed lines in FIG. 8, a contrasting shading is generated between portions where a blur of the pole exists and does not exist, and a vertical striped pattern is generated.

The present invention has an objective of providing an image processing device and program capable of reducing vertical striped patterns generated in the background of composite image when taking a follow shot.

In accordance with a first aspect of the present invention, there is provided an image processing device, comprising: an image obtainer which obtains a chronological sequence of a plurality of images, sets one of the plurality of images obtained as a reference image, and sets a remainder thereof as object images; a parameter calculator which calculates a plurality of parameters for converting each of main subject portions of respective plurality of object images to be aligned so as to be superimposed on a main subject portion of the reference image; and an image combiner which combines images such that the main subject portions are superimposed with alignment degrees of the parameters degrading as distance from a predetermined location increases.

In accordance with a second aspect of the present invention, there is provided an image processing method, comprising: an image obtaining step of obtaining a chronological sequence of a plurality of images, setting one of the plurality of images obtained as a reference image, and setting a remainder thereof as object images; a parameter calculation step of calculating a plurality of parameters for converting each of main subject portions of respective plurality of object images to be aligned so as to be superimposed on a main subject portion of the reference image; and an image combining step of combining images such that the main subject portions are superimposed with alignment degrees of the parameters degrading as distance from a predetermined location increases.

In accordance with a third aspect of the present invention, there is provided a computer readable storage medium having stored therein a program executable by a computer to function as: an image obtainer which obtains a chronological sequence of a plurality of images, sets one of the plurality of images obtained as a reference image, and sets a remainder thereof as object images; a parameter calculator which calculates a plurality of parameters for converting each of main subject portions of respective plurality of object images to be aligned so as to be superimposed on a main subject portion of the reference image; and an image combiner which combines images such that the main subject portions are superimposed with alignment degrees of the parameters degrading as distance from a predetermined location increases.

The present invention makes it possible to reduce vertical striped patterns generated in the background of a composite image when taking a follow shot.

BRIEF DESCRIPTION OF THE DRAWINGS

FIG. 3 is a diagram showing a intensity ratio table stored in a program memory of the digital camera according to the embodiment;

FIG. 4 is a diagram explaining a matching object region in relation to a reference image in the digital camera according to the embodiment;

DETAILED DESCRIPTION OF THE INVENTION

Hereinafter, one embodiment of the present invention is described with reference to the diagrams.

Figure 1:
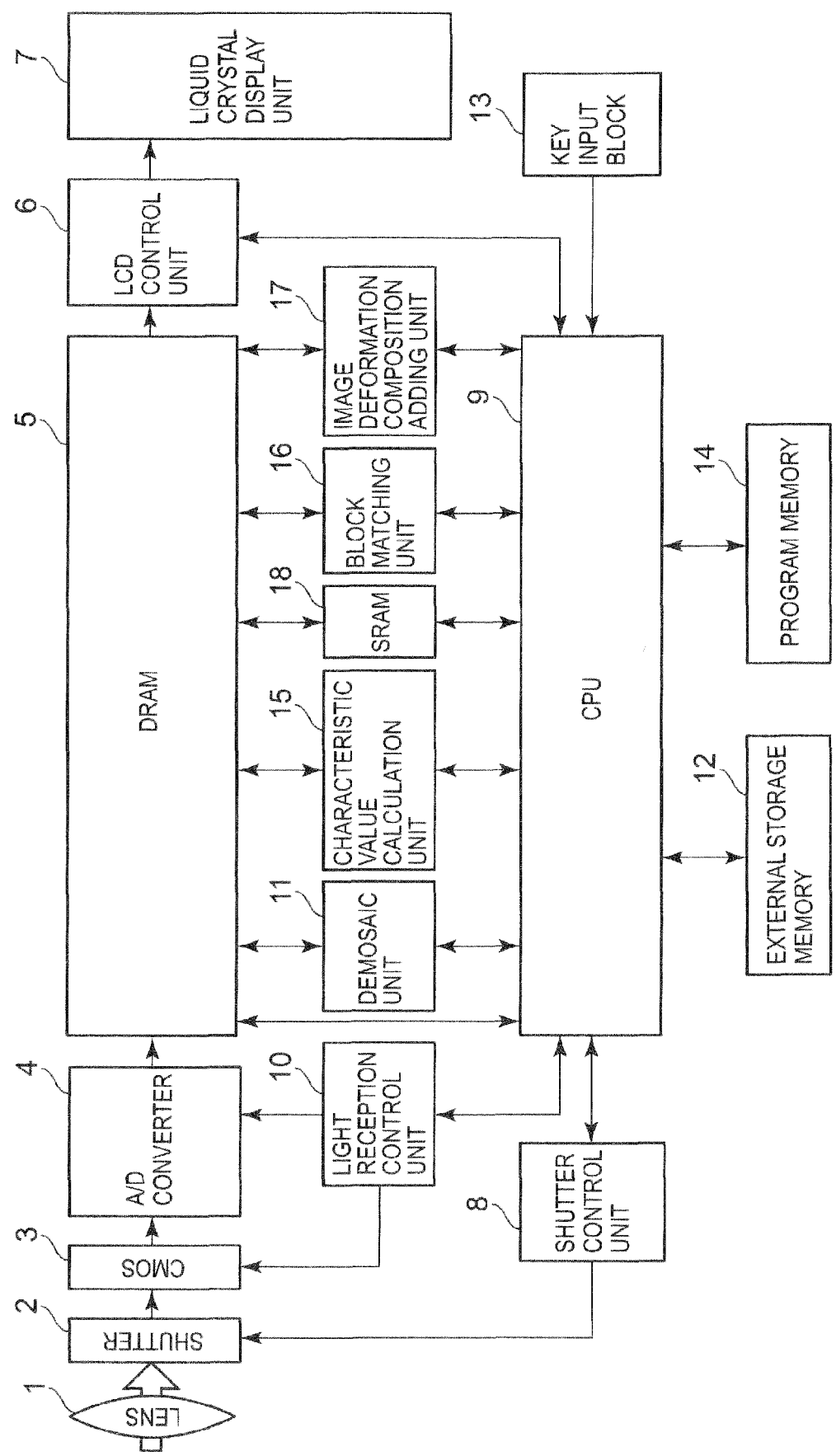
FIG. 1 is a block diagram showing an electrical configuration of a digital camera as an image processing device according to an embodiment of the present invention.

FIG. 1 is a block diagram showing an electrical configuration of a digital camera as an image processing device according to one embodiment of the present invention.

This digital camera has a recording mode for performing photography as a basic action mode, and a playback mode for playing back a photographed image, and is further equipped with a follow shot mode as a subordinate mode of the recording mode. It should be noted that the follow shot mode is a photographic mode to obtain a follow shot in which the main subject is still and a background is moving, by performing photography while having a camera follow and match the movement of the main subject.

The digital camera of the present embodiment includes a photographic lens 1, a shutter 2, a CMOS (Complementary Metal Oxide Semiconductor) sensor 3, an A/D (Analog to Digital) converter 4, DRAM (Dynamic Random Access Memory) 5, an LCD (Liquid Crystal Display) control unit 6, a liquid crystal display unit 7, a shutter control unit 8, a CPU (Central Processing Unit) 9, a light reception control unit 10, a demosaic unit 11, external storage memory 12, a key input block 13, a program memory 14, a characteristic value calculation unit 15, a block matching unit 16, and an image deformation composition adding unit 17.

In a case of photographing in recording mode, the CMOS sensor 3 is designed to receive, through the shutter 2, photographic light, which has been caused to converge by the photographic lens 1 and to output as an image signal an optical image of the subject formed on the light receiving surface after carrying out photoelectric conversion. Next, the output signal of the CMOS sensor 3 is converted to digital image data by the A/D converter 4. In addition, the image data converted by the A/D converter 4 is sequentially stored in the DRAM 5. Moreover, in follow shot mode, image data of a plurality of images is stored in this DRAM 5 at a time of photographing.

The CMOS sensor 3, in follow shot mode, functions as an image obtainer according to the present invention.

Actions of the shutter 2 are controlled by the shutter control unit 8 in accordance with commands from the CPU 9, and actions of the CMOS sensor 3 and the A/D converter 4 are controlled by the light reception control unit 10 operable in accordance with commands from the CPU 9.

Image data of one image worth stored in the DRAM 5, that is to say, RAW data, is interpolated with color information for each pixel by the demosaic unit 11, and after being converted to YUV data, is displayed as a through image on the liquid crystal display unit 7 via the LCD control unit 6.

Moreover, at a time of photography in follow shot mode, the demosaic unit 11 converts RAW data not only to YUV data (a photographic image), but to luminance image data composed of only luminance information (a luminance image) as required. Furthermore, the converted YUV data and luminance data are stored temporarily in the DRAM 5.

In a case of photographing in recording mode, the image data converted to YUV data by the demosaic unit 11 is recorded as a still image file in the external storage memory 12 after being compressed by the CPU 9 in accordance with a predetermined compression technology such as JPEG.

Furthermore, in playback mode, the image data stored as a still image file in the external storage memory 12, after being read by the CPU 9 and uncompressed as necessary, is displayed on the liquid crystal display unit 7 through the LCD control unit 6.

Moreover, the external storage memory 12 is configured, for example, by a memory card removable from the camera body, a flash memory included in the camera body, or the like.

A key input block 13, a program memory 14, a characteristic value calculation unit 15, a block matching unit 16, and an image deformation composition adding unit 17 are connected to the CPU 9.

The key input block 13 is constructed by a plurality of switching elements, including a power key, shutter key, and change mode key, which are used in operations of a digital camera by a user.

The program memory 14 is a memory in which a variety of programs required for operations of the CPU 9, and each kind of data used for execution of the programs, are stored.

The CPU 9, according to a program stored in the program memory 14, controls behavior of each portion of the digital camera according to operation of any of the keys in the key input block 13, and performs compression and decompression processing of the above-described image data.

The characteristic value calculation unit 15, when photographing in follow shot mode, serves as a parameter calculator according to the present invention that calculates a projective transformation matrix with respect to a particular localized region (block) in an image captured by the CMOS sensor 3 and outputs thereof to the CPU 9.

When photographing in follow shot mode, the block matching unit 16 serves as a parameter calculator according to the present invention that uses the SRAM 18 as working memory, performs block matching between a reference image captured by the CMOS sensor 3 and another image, obtains a motion vector indicating relative shift amount and shift direction of a main subject portion in the particular localized region (block) of the reference image, and outputs thereof to the CPU 9.

When photographing in follow shot mode, the image deformation composition adding unit 17 serves as an image combiner according to the present invention that aligns a plurality of images taken by the CMOS sensor 3 and combines thereof, in accordance with an instruction of the CPU 9.

Figure 2:
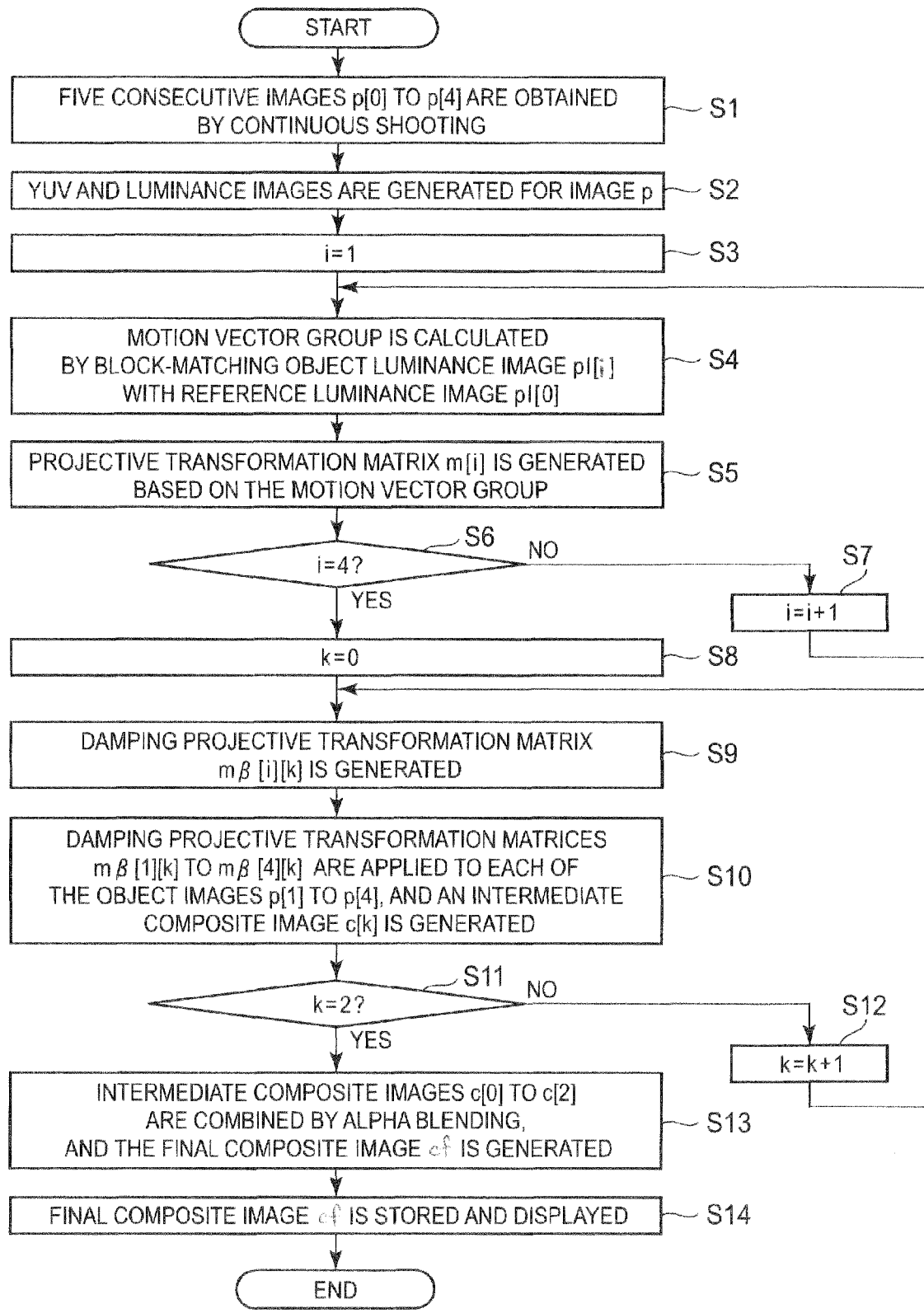
FIG. 2 is a flowchart showing an operation of the digital camera according to the embodiment in the follow shot mode.

FIG. 2 is a flowchart showing an operation of the digital camera in the follow shot mode.

When the change mode key provided on the key input block 13 is operated and the follow shot mode is set, the CPU 9 reads out a program for executing processing of the flowchart shown in FIG. 2 from the program memory 14. The CPU 9 executes a variety of processing in the flowchart shown in FIG. 2 in accordance with to this program.

Furthermore, as shown in FIG. 3, an intensity ratio table indicating a relation between an index k of a hereinafter described intermediate composite image and an intensity ratio $\beta$ of a damping projective transformation matrix is stored in the program memory 14.

According to this intensity ratio table, when k=0, the intensity ratio $\beta$=1 (no damping), when k=1, the intensity ratio $\beta$=3/4 (25% damping ratio), and when k=2, the intensity ratio $\beta$=1/2 (50% damping ratio).

The CPU 9 displays a through image on the liquid crystal display unit 7 along with settings of the follow shot mode.

Moreover, a grid may be displayed in a center portion in a frame superimposed on the through image by way of generally known OSD (On Screen Display) technology. When a photographer causes the orientation of a camera to follow movement of the main subject, this grid is used to guide the main subject to a specific position within a frame.

First, in Step S1, the CPU 9 monitors operation of a shutter key, and when operation of the shutter key is detected, performs continuous shooting for 5 shots. For example, in a state in which photographic conditions of each time are set so that the exposure becomes seamless, RAW data of five images captured continuously in time by the CMOS sensor 3 with a shutter time of 1/60 second and a continuous shooting speed of 60 fps are obtained, and stored in the DRAM 5.

During this continuous shoot, the photographer has the camera follow the movement of a main subject so that the main subject is positioned in a central portion in the photography frame.

Hereinafter, the obtained five consecutive images in a time series are set as p[0] to p[4], one of these obtained images is set as a reference image p[0], and the remainder are set as object images p[1] to p[4].

In Step S2, YUV and luminance images are generated for each of the obtained images p[0] to p[4].

More specifically, the demosaic unit 11 converts each of the RAW data stored in the DRAM 5 into YUV data and luminance image data composed of only a luminance component, and stores the image data after conversion in the DRAM 5. Here, the YUV data is image data for composition, and the luminance image data is reduced image data of a sufficient size for an alignment task at a time of generating an intermediate composite image.

Hereinafter, a luminance image of the reference image p[0] is set as a reference luminance image pl[0], and luminance images of object images p[1] to p[4] are set as object luminance images pl[0] to pl[4].

In Step S3, counter i, which is an index of object luminance image pl[i], is set to 1.

In Step S4, a motion vector group (a set of motion vectors) for an object luminance image pi[i] of a main subject portion is calculated in relation to reference luminance images pl[0].

More specifically, as shown in FIG. 4(a), a rectangular matching object region "a" is set in a center portion of the reference luminance image pl[0]. The vertical length of this matching object region "a" is ½ of a vertical length of the reference luminance image pl[0], and the horizontal length thereof is ½ of a horizontal length of the reference luminance image pl[0].

In addition, as shown in FIG. 4(b), this matching object region is divided into a plurality of blocks made to be units of 16 vertical pixels×16 horizontal pixels, and block matching is performed for each block in the object luminance image pl[i].

That is to say, for each block, a search is performed within a predetermined range centered on a block of identical coordinates in the object luminance image pl[i] by evaluating a sum of the square of the difference between the blocks. Then, based on a position where the sum of the square of the difference is minimized, a motion vector of the block indicating a relative shift amount and shift direction is calculated.

In Step S5, based on the motion vector group, a projective transformation matrix m[i] is generated that transforms a main subject portion of object luminance images pl[i] to be aligned so as to be superimposed on a main subject portion of the reference luminance image pl[0].

More specifically, a projective transformation matrix m[i] is generated from among the motion vector groups by the RANSAC method.

The RANSAC method is a method whereby an outlier (motion vectors of irregularly moved blocks) is eliminated and a projective transformation matrix is calculated. More specifically, if a projective transformation matrix support ratio (a ratio of inliers (samples or which a transformation matrix is valid) to total samples) obtained by the RANSAC method is equal to or greater than a certain value, then generation of the projective transformation matrix by the RANSAC method is deemed successful, and the transformation matrix is determined to be valid.

In Step S6, it is determined whether i=4. In a case in which this determination is NO, control transitions to Step 1, the counter i is incremented, and the Step S4 is returned to. On the other hand, in a case in which this determination is YES, control transitions to Step S8.

According to the above-mentioned Steps S1 to S7, projective transformation matrices m[1] to m[4] are generated for all object luminance images pl[1] to pl[4].

In Step S8, a counter k, which is an index of an intermediate composite image, is again set to zero.

Figure 5:
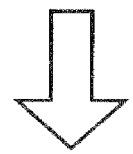
FIG. 5 is a diagram explaining a procedure for generating a projective transformation matrix in the digital camera according to the embodiment.

In Step S9, the above-described intensity ratio table is referred to and, as shown in FIG. 5, an intensity ratio β corresponding to a value of the counter k is read out, and a damping projective transformation matrix mβ[i] [k], which has set alignment degrees of parameters of a protective transformation matrix m[i] as an intensity ratio β, is generated. The intensity ratio β serves as a damping factor of the damping projective transformation matrix mβ[i] [k] Here, for the intensity ratio β, β=1 when k=0, β=¾ when k=1, and β=½ when k=2.

In Step S10, damping projective transformation matrices mβ[1] [k] to mβ[4] [k] corresponding to the counter k are applied to each of object images p[1] to p[4], each of the object images p[1] to p[4] is averaged with the reference image p[0], and an intermediate composite image c[k] is generated.

For example, the intermediate composite image c[1] is an image generated by applying the damping projective transformation matrix mβ[1] [1] to the object image p[1], applying the damping projective transformation matrix mβ[2] [1] to the object image p[2], applying the damping projective transformation matrix mβ[3] [1] to the object image p[3], applying the damping projective transformation matrix mβ[4] [1] to the object image p[4], and averaging with the reference image p[0].

In Step S11, it is determined whether the counter k=2. In a case in which this determination is NO, the counter k is incremented (Step S12), and Step S9 is returned to. In a case in which this determination is YES, control transitions to Step S13.

Figure 6:
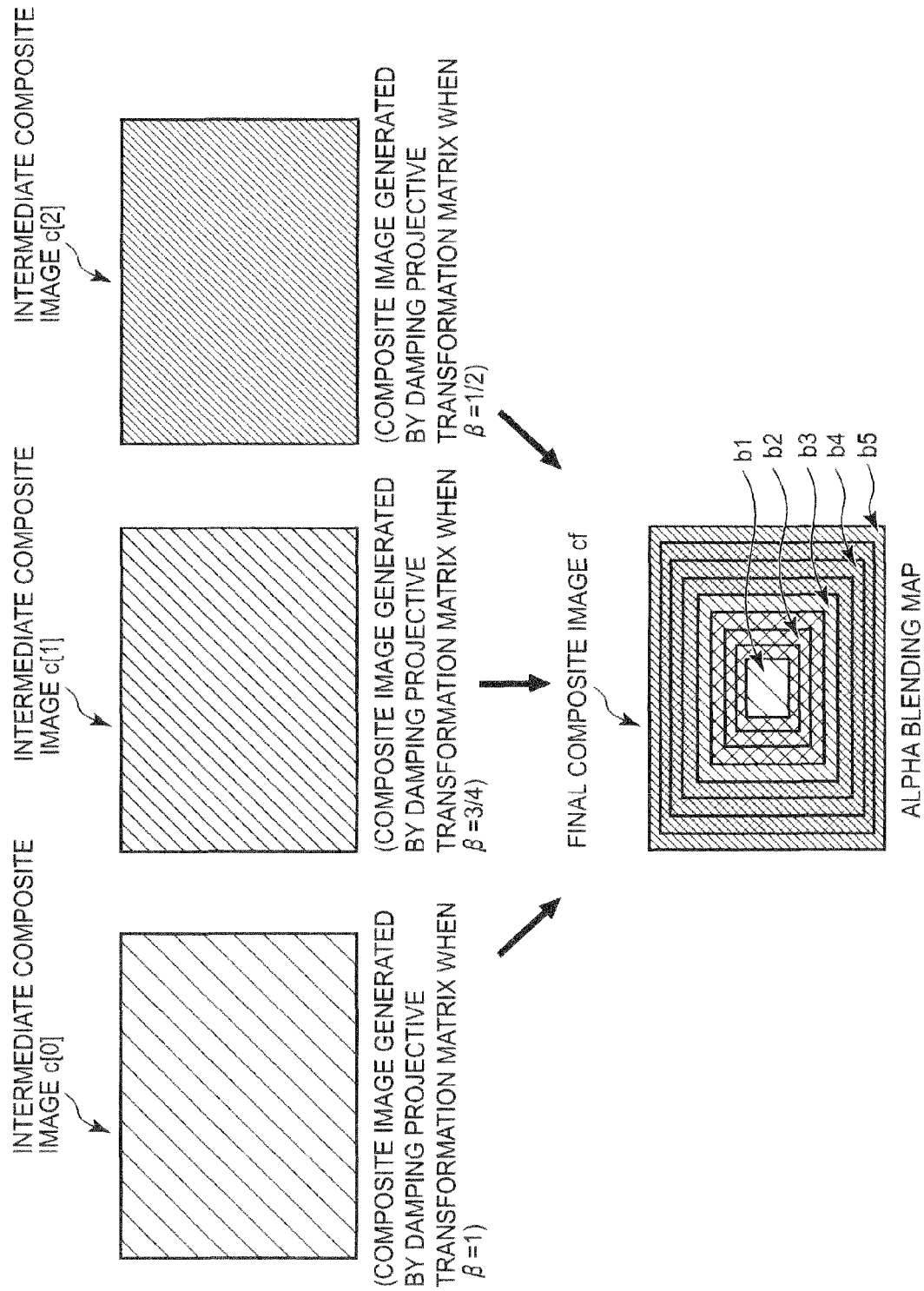
FIG. 6 is a diagram showing a map for combining intermediate composite images in the digital camera according to the embodiment.

In Step S13, according to the map shown in FIG. 6, intermediate composite images c[0] to c[2] are combined by alpha blending, and the final composite image of is generated.

More specifically, the final composite image of is configured of a first region $b_1$ which is a rectangular region of a center portion, a second region $b_2$ which is a frame-shaped region on an exterior side of this first region $b_1$, a third region $b_3$ which is a frame-shaped region on an exterior side of this second region $b_2$, a fourth region $b_4$ which is a frame-shaped region on an exterior side of this third region $b_3$, and a fifth region $b_5$ which is a frame-shaped region on an exterior side of this fourth region $b_4$.

A vertical length of this first region $b_1$ is ⅓ of a vertical length of the final composite image cf, and a horizontal length thereof is ⅓ of a horizontal length of the final composite image cf.

This first region $b_1$ is generated by only the intermediate composite image c[0].

The width of the portion vertically extending from the second region $b_2$ is ⅛ of a horizontal length of the final composite image cf, and the width of the portion horizontally extending from the second region $b_2$ is ⅛ of a vertical length of the final composite image cf.

This second region $b_2$ is generated by combining the intermediate composite images c[0] and c[1] by alpha blending. The width of the second region $b_2$ is divided equally into three portions, and the blending ratios of the intermediate composite images c[0] and c[1], in order from the inner side, are 75% and 25%, 50% and 50%, and 25% and 75%, respectively.

The width of the portion vertically extending from the third region $b_3$ is 1/24 of a horizontal length of the final composite image cf, and the width of the portion horizontally extending from the third region $b_3$ is 1/24 of a vertical length of the final composite image cf.

This third region $b_3$ is generated by only the intermediate composite image c[1].

The width of the portion vertically extending from the fourth region $b_4$ is ⅛ of a horizontal length of the final composite image cf, and the width of the portion horizontally extending from the fourth region $b_4$ is ⅛ of a vertical length of the final composite image cf.

This fourth region $b_4$ is generated by combining the intermediate composite images c[1] and c[2] by alpha blending.

The width of the fourth region $b_4$ is divided equally into three portions, and the blending ratios of the intermediate composite images c[1] and c[2], in order from the inner side, are 75% and 25%, 50% and 50%, and 25% and 75%, respectively.

The width of the portion vertically extending from the fifth region $b_5$ is 1/24 of a horizontal length of the final composite image cf, and the width of the portion horizontally extending from the fifth region $b_5$ is 1/24 of a vertical length of the final composite image cf.

This fifth region $b_5$ is generated by only the intermediate composite image c[2].

Figure 7:
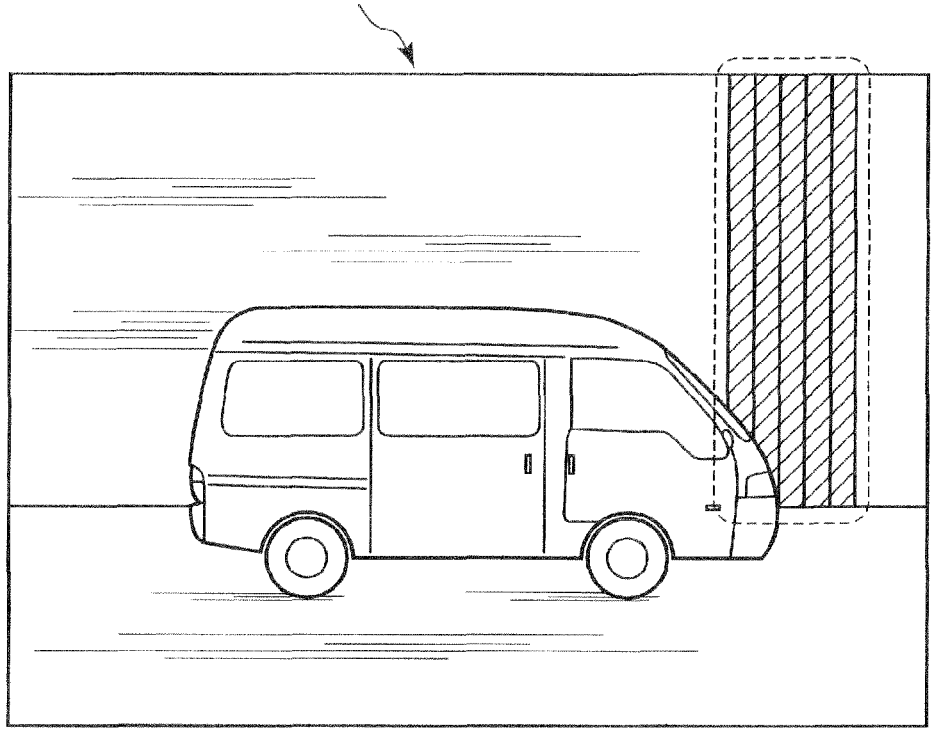
FIG. 7 is a diagram showing a concrete example of a final composite image in the digital camera according to the embodiment.
Figure 8:
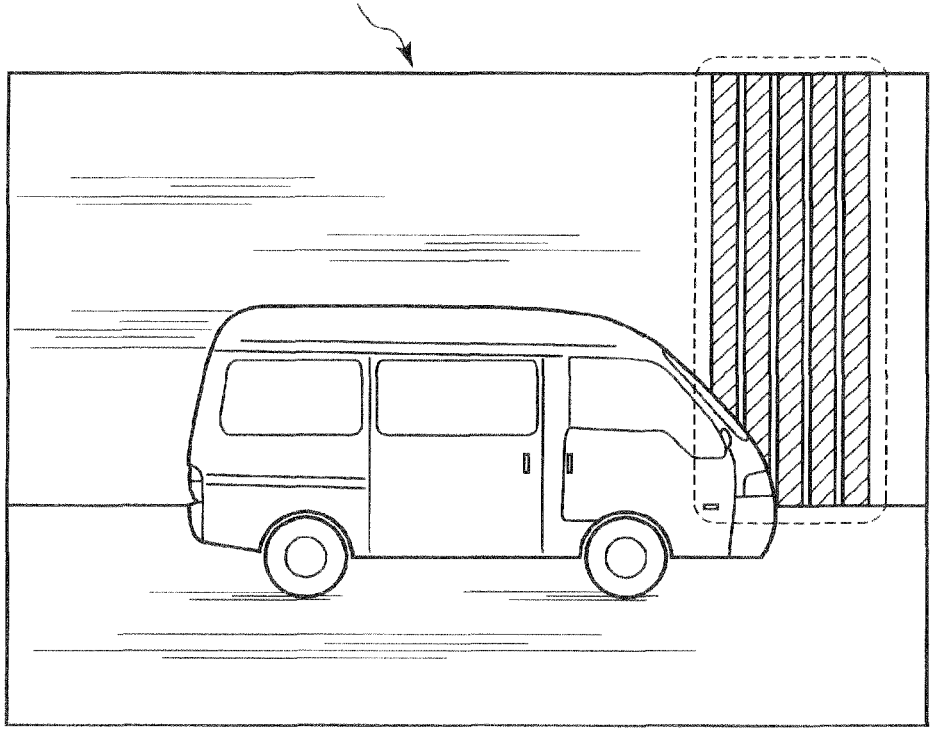
FIG. 8 is a diagram showing a concrete example of a final composite image in the digital camera of the prior art.

For example, in a case in which an object of small horizontal dimension, such as a pole, is included in a background, as shown by the dashed line in FIG. 7 in the final composite image 21 of the present embodiment, the portions of the pole in which there is a blur are in proximity to one another, and the portions in which there is no blur are reduced, thereby resulting in the vertical striped pattern not being noticeable.

In Step S14, the CPU 9 sequentially compresses and encodes image data of a final composite image cf, stores the compressed and encoded image data in DRAM 5, and records thereof in an external storage memory 12 in addition to displaying thereof on the liquid crystal display unit 7.

According to the present embodiment, there are the following effects.

(1) For each of four object luminance images pl[1] to pl[4], a motion vector group for a reference luminance image pl[0] of a main subject portion is obtained, and based on the vector group, projective transformation matrices m[1] to m[4] are generated, converting the main subject portions of the object luminance images pl[1] to pl[4] to be aligned so as to be superimposed on the main subject portions of the reference luminance image pl[0]. Next, three types of intermediate composite images c[0] to c[2] are generated by introducing an intensity ratio β for the projective transformation matrices m[1] to m[4], generating damping projective transformation matrices mβ[1] to mβ[4], changing the intensity ratio β over three levels, applying thereof to object images p[1] to p[4], and averaging the object images p[1] to p[4] with the reference image pl[0]. Next, the three types of intermediate composite images c[0] to c[2] are combined so that an intensity β decreases as the main subject becomes farther, and a single final composite image of is generated.

In this manner, since alignment is restricted so that the intensity ratio β is decreased as the main subject becomes farther, it is possible to reduce a vertical striped pattern occurring on a background of the final composite image of at a time when a follow shot is taken.

(2) Three types of intermediate composite images c[0] to c[2] are combined by alpha blending so that an intensity ratio β of damping projective transformation matrices mβ[1] to mβ[4] decreases from the center of the final composite image of to the periphery. The main subject can be determined to be positioned at substantially a center of a photographic frame, and therefore, by configuring in this manner, it is possible to lighten a calculation load of a circuit.

(3) The RANSAC method is adopted to generate projective transformation matrices m[1] to m[4] based on the motion vector group. Therefore, motion vectors of irregularly moved blocks can be eliminated, and therefore, it is possible to increase the precision of alignment of a main subject according to the projective transformation matrices.

Moreover, the present invention is not limited to the above-described embodiment, and modifications, improvements, and the like within a scope of achieving the objective of the present invention are included in the present invention.

For example, although in the present embodiment, when three types of intermediate composite images c[0] to c[2] were combined by alpha blending, a main subject was assumed to be present at a center of a photographic image, and therefore an intensity ratio β of damping projective transformation matrices mβ was decreased from the center of the final composite image of to the periphery, the present invention is not limited thereto. That is to say, a correlation between a reference image and an object image in units of pixels may be determined, assuming a region of high correlation to be a main subject region and setting an intensity ratio thereof as 1, and the intensity ratio may be reduced with increasing distance from the region of high correlation.

Furthermore, in the above-described embodiment, although the present invention is applied to a digital camera in which the imaging device is constituted by a CMOS sensor, the present invention is not limited to this, and another imaging device such as a CCD may be used.

In addition, all or a portion of the functions of the demosaic unit 11, the characteristic value calculation unit 15, the block matching unit 16, or the image deformation composition adding unit 17 may be carried out by causing the CPU 9 to operate according to a predetermined program.

Moreover, the present invention is not limited to a digital camera, and can be applied to another photographic device having a still image photography function, such as a mobile phone unit with a camera.

Furthermore, the present invention is not limited to a photographic device, and may also be applied to any image processing device having functions generating a follow shot image from a chronological sequence of a plurality of images. In addition, a personal computer carrying out the aforementioned functions by operating based on a predetermined program is also included in such processing devices.

What is claimed is:

1. An image processing device, comprising:
   an image obtainer which obtains a chronological sequence of a plurality of images, sets one of the plurality of images obtained as a reference image, and sets a remainder of the plurality of images as object images;
   a projective transformation matrix calculator which calculates a projective transformation matrix for converting each of main subject portions of respective ones of the plurality of object images to be aligned so as to be superimposed on a main subject portion of the reference image;

an intermediate image generator which generates a plurality of intermediate images by applying different predetermined intensity ratios to respective ones of the plurality of object images, wherein each of the plurality of intermediate images is obtained by averaging the reference image and each of the plurality of object images to which the projection transformation matrix has been applied; and an image combiner which combines the plurality of intermediate images.

2. An image processing method, the method comprising:

obtaining a chronological sequence of a plurality of images, setting one of the obtained plurality of images as a reference image, and setting a remainder of the obtained plurality of images as object images;

calculating a projective transformation matrix for converting each of main subject portions of respective ones of the plurality of object images to be aligned so as to be superimposed on a main subject portion of the reference image;

generating a plurality of intermediate images by applying different predetermined intensity ratios to respective ones of the plurality of object images, wherein each of the plurality of intermediate images is obtained by averaging the reference image and each of the plurality of object images to which the projection transformation matrix has been applied; and combining the plurality of intermediate images.

3. A non-transitory computer readable storage medium having a program stored thereon which is executable by a computer to function as:

an image obtainer which obtains a chronological sequence of a plurality of images, sets one of the plurality of images obtained as a reference image, and sets a remainder of the obtained reference images as object images;

a projective transformation matrix calculator which calculates a projective transformation matrix for converting each of main subject portions of respective ones of the plurality of object images to be aligned so as to be superimposed on a main subject portion of the reference image;

an intermediate image generator which generates a plurality of intermediate images by applying different predetermined intensity ratios to respective ones of the plurality of object images, wherein each of the plurality of intermediate images is obtained by averaging the reference image and each of the plurality of object images to which the projection transformation matrix has been applied; and an image combiner which combines the plurality of intermediate images.

4. The image processing device according to claim 1, wherein the image combiner blends and combines the plurality of intermediate images such that a ratio of intermediate images to which an intensity ratio with a larger degree of degrading is applied increases as a distance from a predetermined location increases.

5. The image processing device according to claim 4, wherein the predetermined location is a center of an angle of view.

6. The image processing device according to claim 4, wherein the predetermined location is the main subject portion.

7. The method according to claim 3, wherein combining the plurality of intermediate images comprises blending and combining the plurality of intermediate images such that a ratio of intermediate images to which an intensity ratio with a larger degree of degrading is applied increases as a distance from a predetermined location increases.

8. The method according to claim 7, wherein the predetermined location is a center of an angle of view.

9. The method according to claim 7, wherein the predetermined location is the main subject portion.

10. The computer readable storage medium according to claim 7, wherein the image combiner blends and combines the plurality of intermediate images such that a ratio of intermediate images to which an intensity ratio with a larger degree of degrading is applied increases as a distance from a predetermined location increases.

11. The computer readable storage medium according to claim 10, wherein the predetermined location is a center of an angle of view.

12. The computer readable storage medium according to claim 10, wherein the predetermined location is the main subject portion.

* * * * *